(12) United States Patent
Sandaire

(10) Patent No.: US 7,512,675 B2
(45) Date of Patent: Mar. 31, 2009

(54) CLEANING AND REMOVING DUPLICATED UNIQUE IDENTIFIERS FROM REMOTE NETWORK NODES

(75) Inventor: Johnny Sandaire, Union, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 806 days.

(21) Appl. No.: 10/856,485

(22) Filed: May 28, 2004

(65) Prior Publication Data

US 2005/0278438 A1    Dec. 15, 2005

(51) Int. Cl.
*G06F 15/177* (2006.01)
*G06F 15/173* (2006.01)

(52) U.S. Cl. .................. 709/223; 709/220; 709/221; 709/224; 709/225; 709/226

(58) Field of Classification Search ......... 709/220–226; 370/254
See application file for complete search history.

(56) References Cited

U.S. PATENT DOCUMENTS

| | | | | |
|---|---|---|---|---|
| 5,933,820 | A * | 8/1999 | Beier et al. ................... 707/1 |
| 6,611,521 | B1 * | 8/2003 | McKay et al. ............. 370/392 |
| 6,987,726 | B1 * | 1/2006 | Elliott ....................... 370/217 |
| 7,085,292 | B1 * | 8/2006 | Grayson ..................... 370/475 |
| 7,246,228 | B2 * | 7/2007 | Sato et al. ................. 713/100 |
| 2001/0029534 | A1 * | 10/2001 | Spinks et al. .............. 709/224 |
| 2003/0149787 | A1 * | 8/2003 | Mangan ..................... 709/238 |
| 2004/0024860 | A1 * | 2/2004 | Sato et al. ................. 709/223 |
| 2004/0047298 | A1 * | 3/2004 | Yook et al. ................. 370/254 |
| 2004/0059817 | A1 * | 3/2004 | Ueno et al. ................ 709/224 |
| 2005/0216575 | A1 * | 9/2005 | Armstrong et al. ......... 709/223 |

* cited by examiner

*Primary Examiner*—Nathan J Flynn
*Assistant Examiner*—Joshua Joo

(57) ABSTRACT

A centralized network managed distributed computing system includes a number of network nodes, such as workstations, a network connection medium, such as the Internet, and a server for managing the network of nodes. Unique identifiers are assigned to each network node during a first scanning operation to uniquely identify each network node and each node's installed software and hardware configurations. If a new machine is prepared for operation in the network by installing a software configuration that is a duplicate of an already scanned machine, a duplicate of a supposedly unique identifier can be introduced into the distributed computing system. Techniques of resolving duplicate network node identification in a centralized server managed distributed computing system are also described. Network nodes are scanned to obtain a network node information record including a unique identification (UID) from each network node. A new UID is generated to be installed on the network node, if the network node's UID is found on a duplicate UID listing. The network node information records including the UIDs are then processed through a series of business rule filters to determine if there are duplicate UIDs. A duplicate UID listing is created for the distributed computing system and email messages are sent to network nodes with duplicate UIDs indicating the nature of the problem found.

12 Claims, 3 Drawing Sheets

CLEANING AND REMOVING DUPLICATED UNIQUE IDENTIFIERS FROM REMOTE NETWORK NODES

CROSS REFERENCE TO RELATED APPLICATIONS

The present invention is related to U.S. Pat. No. 6,574,729 entitled "System for Remotely Identifying and Providing Information of Unknown Software on Remote Network Node by Comparing the Unknown Software with Software Audit File Maintained on Server" and to a commonly owned U.S. patent application Ser. No. 10/856,482 entitled "Remotely Identifying Software on Remote Network Nodes by Discovering Attributes of Software Files and Comparing Software File Attributes to a Unique Signature from an Audit Table" filed contemporaneously herewith, assigned to the assignee of the present invention and incorporated by reference herein in their entirety.

FIELD OF INVENTION

The present invention relates generally to a distributed computing system, and more particularly to accurate remote identification, assessment and management of network elements in a distributed computing system.

BACKGROUND OF THE INVENTION

The resources and computation tasks in a computing system are frequently spread among a plurality of network nodes to form a distributed computing system with a centralized network management system to manage shared resources. While the centralization of shared resources potentially makes the administration and maintenance of network elements more efficient and reliable, the increasing diversity of network elements in distributed computing systems provides additional challenges for network management systems that attempt to manage network resources in a uniform manner. In a large network environment, for example, the task of maintaining an inventory of the connected personal computers and workstations, as well as the software installed on each machine, can be overwhelming. In addition, the inventory is typically not static as new machines and software are incorporated and existing software products and machines are retired from use on an ongoing basis.

One of the issues of a dynamic nature concerns how new machines are introduced into the inventoried system and how existing machines, due to some type of failure or virus infection, may be reinstalled in their original state. Many times, a number of new machines are prepared for system installation by taking a snapshot image of a machine with a prespecified software configuration and then duplicating this software configuration image on multiple machines prior to installation or delivery. The snapshot image may contain a machine unique identifier that is also duplicated in the process. This duplication of the unique identifier causes problems. A similar situation exists with machines already in use, if for some reason, the operating software configuration becomes corrupted and the machine is reinitialized to its original configuration. This reinitialization may also cause a unique identifier to be duplicated.

Thus, there exists a need for a dynamic and accurate inventory management system and method that takes into account the methods of preparing machines for system installation and for introducing existing machines that have been reinitialized to an original machine configuration.

SUMMARY OF THE INVENTION

Among its many aspects, one embodiment of the present invention addresses a method of resolving duplicate network node identification in a centralized server managed distributed computing system. Network nodes are scanned to obtain a network node information record including a unique identification (UID) from each network node. A new UID is generated to be installed on the network node if the network node's UID is found on a duplicate UID listing. The network node information records including the UIDs are then processed through a series of business rule filters to determine if there are duplicate UIDs. A duplicate UID listing is created for the distributed computing system and email messages are sent to network nodes with duplicate UIDs indicating the nature of the problem found.

A more complete understanding of the present invention, as well as, other features and advantages of the invention, will be apparent from the following detailed description and the accompanying drawings.

DETAILED DESCRIPTION

Figure 1:
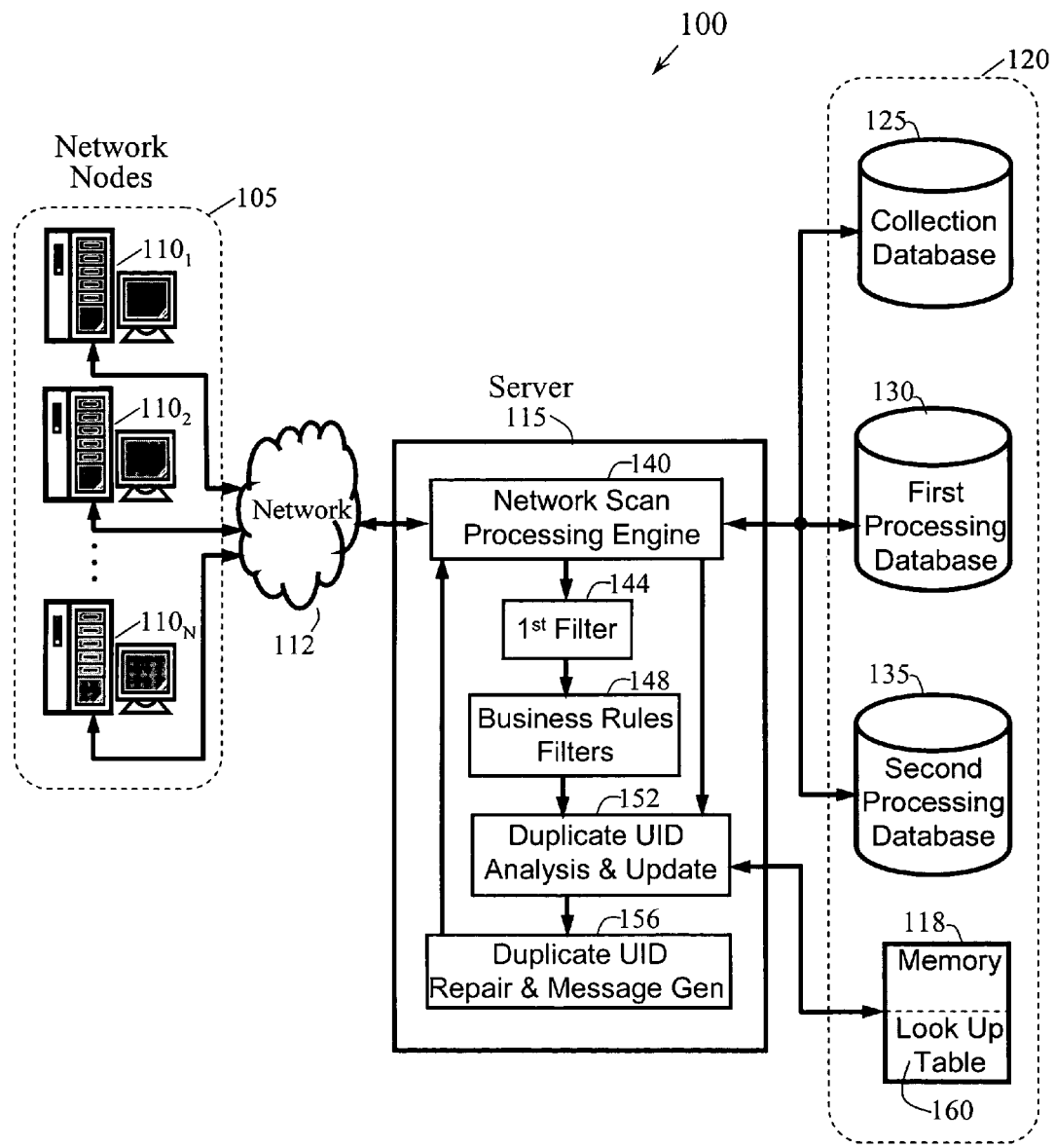
FIG. 1 illustrates a centralized network managed distributed computing system in accordance with the present invention.

FIG. 1 illustrates a centralized network managed distributed computing system 100 that includes a number of network nodes 105, such as workstations $110_1$-$110_N$, a network connection medium 112, such as an Internet connection medium, and a server 115 with an internal processor and a memory 118 for storing data, such as tables. The server 115 manages the network of nodes and provides a set of collection and processing databases 120 containing a collection database 125, a first processing database 130, a second processing database 135, and associated server memory 118. While for ease of illustration, network nodes 105, a network medium 112, a memory block 118, and databases 120 are shown as single units, it is recognized that these elements can be implemented in numerous ways and by a plurality of elements. For example, the network 112 may be a local area network (LAN), a wide area network (WAN), or other such interconnection medium. The network nodes 105, for example workstations $110_1$-$110_N$, may be embodied as laptops, other personal computers, servers, routers, or the like. The memory 118 may be a hierarchy of random access memories including caches. The databases 120 may be stored on single or multiple hard disk storage devices.

The server 115 consists of a network scan processing engine 140 which interfaces to the network nodes 105 through network 112. Scan results are processed in the server 115 in accordance with the present invention by use of a first filter 144 and business rules filters 148, which are described in further detail below. A duplicate unique identifier (UID) analysis and update function 152 provides an analysis of network node UIDs, prepares updates to a table of duplicate UIDs, and stores the duplicate UID table updates in memory 118 to provide efficient processing. A duplicate UID repair and message generator (Gen) function 156 may repair duplicate UIDs during scan result collection and may report duplicate UID messages were detected as described in further detail below.

The server 115 communicates with each network node 105 to identify the software and hardware that is installed on each network node for asset management control. To accomplish such identification tasks, a server module process is used that periodically scans the network nodes. Each network node, such as workstation 1101, performs its own inventory scan of its installed software and hardware configuration and reports the scan results to the server 115. This scanning and reporting of scan results is called a collection phase. The first time each network node is scanned, the server 115 generates a unique identifier (UID) for each node. Each unique identifier is then stored locally on the UID's associated network node, such that each network node can be quickly and uniquely identified as a separate entity within an asset allocation database process. On subsequent network node scans, a new UID is generally not required if a UID already exists on the scanned node and therefore a new UID would not be generated. It is assumed that each UID is truly unique, uniquely assigned to individual machines, and the existence of a valid UID on a machine precludes any need for further analysis.

However, if a new machine is prepared by installing a software configuration that is a duplicate of an already scanned machine and then introduced into the inventoried system, a duplicate of a supposedly unique identifier can be introduced into the inventoried system.

In addition, if an existing already inventoried machine has its software reinstalled to an original state from a pre-imaged machine, there exists the possibility that this already inventoried machine will have inherited a unique identifier from that cloned image and will, henceforth, contain a duplicate unique identifier. In either case or in case of some other event resulting in duplicate UIDs, machines with duplicate unique identifiers are not listed as unique and only a single machine's most current scan results will be reported instead of listing each machine, containing the duplicate unique identifier, separately. In large systems where significant numbers of network nodes are added and subtracted from the system many times on a daily basis, this inventory problem can be dramatic with thousands of machines installed with duplicate unique identifiers. Since the suppliers of workstations, personal computers, and the like, many times use a software duplication process to prepare machines for delivery, the problem tends to reoccur and has not previously been easy to resolve.

Figure 2:
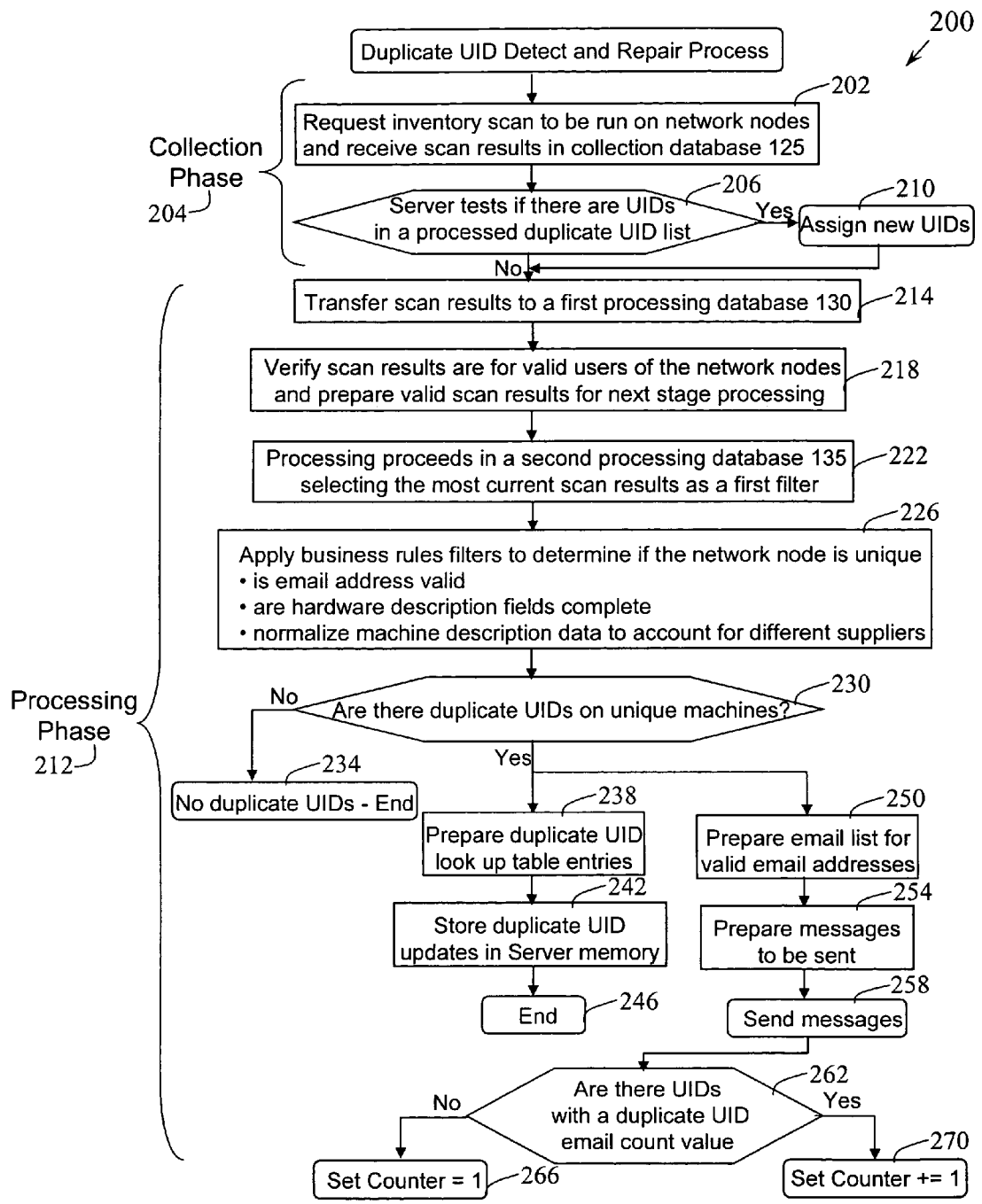
FIG. 2 illustrates a duplicate UID detect and repair inventory process in accordance with the present invention.

One solution to such problems in accordance with the present invention consists of a duplicate UID detect and repair process that, at the same time, regains lost assets and reintroduces them into the inventory process. FIG. 2 illustrates a duplicate UID detect and repair process 200, in accordance with one embodiment of the present invention, for resolving the problem with duplicate unique identifiers.

Network nodes 105 individually run an inventory scan for a number of reasons, such as receiving a request to run an inventory scan from the server 115, step 202. The inventory scan gathers data on the network node's own installed software and hardware configuration and reports the scan results to the server 115 which stores the results in a collection database, such as collection database 125, as part of a collection phase 204 for the distributed computing system. As part of the collection phase 204, the server determines whether a unique identifier (UID) exists on each network node and the server module issues a UID to each network node if none is found to currently exist, as may occur on newly installed machines. The server also determines if a UID is listed in a previously processed duplicate UID list in step 206. The previously processed duplicate UID list indicates that the listed UIDs have previously been found to be duplicates, as described in more detail below. If a UID is found on the duplicate UID listing, a new UID is assigned to the network node in step 210.

The collection phase data is typically processed at a predetermined time, such as overnight. At the predetermined time, a processing phase 212 of the duplicate UID detect and repair process 200 begins by transferring the collection database 125 to a first processing database 130 in step 214. A verification process is used to verify the scan results for valid users of the network nodes in step 218, which will then be made available for the next stage of processing. Machine scan data for invalid users are tagged and handled separately. This preparation may include, for example, organizing the data and storing the data in special temporary tables.

The results of this file processing, for example, scanned data files for verified valid users, are moved to a second processing database 135 and are filtered by time stamp to obtain the most current scan results in step 222.

At this stage in processing, in order to determine if a machine has a duplicate UID, the machine must be determined to be a unique machine. For example, if a user replaces an existing machine with a different machine and initializes the replacement machine with a copy of a software image of the previous machine, there may be a duplicate UID problem, if the software image also copied the previous machine's UID that was assigned during its initial scan. When replacement machines are purchased from a manufacturer, the standard installed software may be different than the organization requires. Daily software requirements, such as word processing and database tools need to be installed and tested locally, as per their agreement with software vendors, etc. As such, getting one machine and installing all the necessary software that the organization is licensed to use that will then be replicated to the remaining lot is a cost-saving approach for any IT department. However, if a local Asset Management tool is used after this image preparation, which may generate a local UID for the initial machine in preparation, the remaining machines will also receive this UID and will therefore be classified as a duplicate ID. Moreover, the replacement machine may have hardware differences from the previous machine or even if the hardware is the same, it may have been supplied from a different supplier than the previous machine and the data records in storage, such as flash memory, may be different. Each supplier of machines may have a different method of specifying a machine's hardware and software configuration and recording this information in the machine. Unique machines require their own unique UID. Consequently, the most current scan results for verified valid users are processed by a series of business rule filters to determine whether the network node is unique. These business rules can include, for example, a determination of whether a valid email address exists for the user registered to the machine as its owner and whether the hardware description, such as Make, Model and Manufacturer's description fields are complete. It is important to have a valid email address in order to inform the assigned owner of the network node that was scanned if there is a duplicate UID problem. Machines with duplicate UIDs, but not having a valid email address, are flagged to indicate such a condition and remain in the system. It is also important to have proper machine hardware description fields. Where proper machine hardware description fields are not present, the machine data file is tagged indicating it is incomplete and additional analysis and research is necessary in order to properly identify the proper hardware description data.

Figure 3:
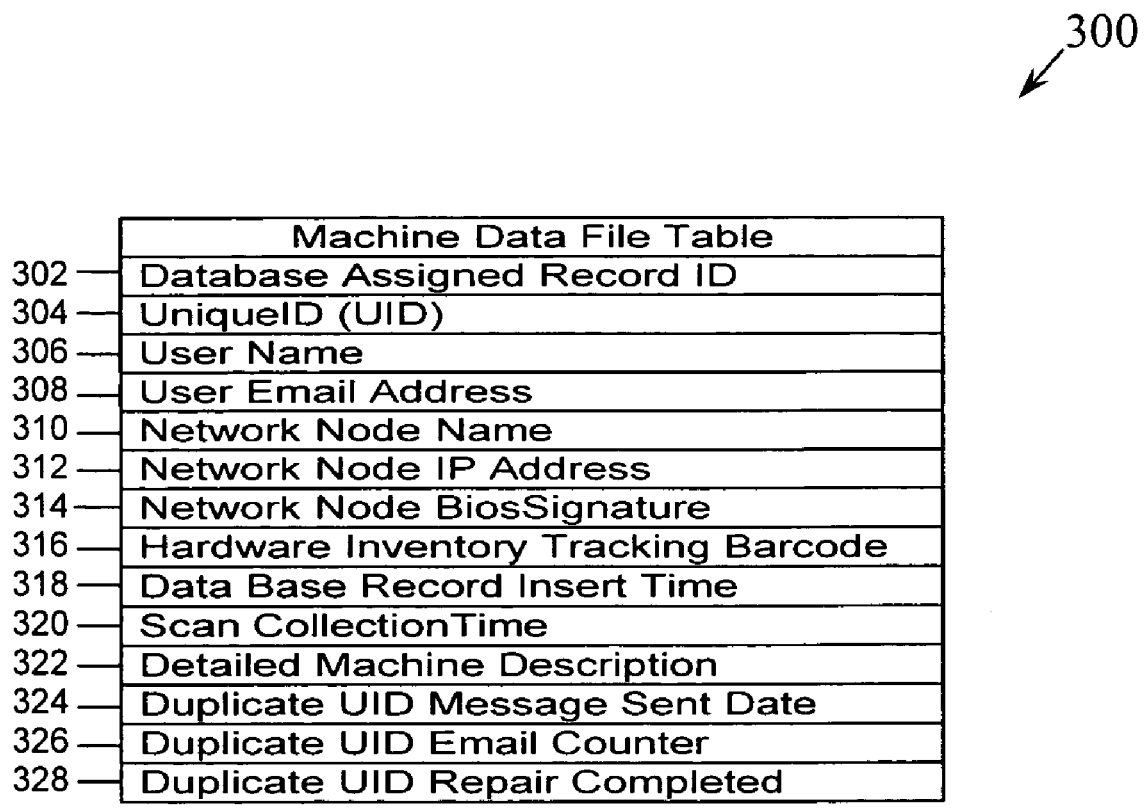
FIG. 3 illustrates an example of a network node machine data file table in accordance with the present invention.

Further business rules can include the processing of the machine description data to account for different suppliers to normalize the data for further analysis and processing. The application of the business rule filters is accomplished in step 226. For example, the machine data files, at this point in the processing sequence, may contain data entries such as those shown in FIG. 3, machine data file table 300.

In the illustrative machine data file table 300, a database assigned record ID 302 is a unique identification number. Each machine data file record, of network node scanned results, will have its own unique identification number. The UID 304 is the unique identification for a particular network node that is stored on a network node, reported on a scanning operation, and may or may not be unique, as described above. A user name 306 and an email address 308 are also associated with this machine. A user's name 306 is used in email notification operations and the email address 308 indicates where network node notifications can be sent. Additionally, a network node name 310, a network node IP address 312 and the like, such as a domain name, are useful in determining the location of the network node in the network environment. A BIOS Signature 314 and an inventory tracking barcode entry 316 are also associated with the network node to provide further identifying information on the network node. To keep track of the network node data files, a database record insert-time 318 indicates when the record was added to the database and a scan collection time 320 is a time stamp of the network node scan operation that occurred in the collection phase 204.

A detailed machine description entry 322 may contain information concerning a manufacturer, supplier, or the like, that specifies, for example, origination information concerning the network node. A duplicate UID message sent date 324 keeps track of the date the last duplicate UID message was sent and a duplicate UID email counter 326 represents the number of duplicate UID email messages sent to the network node user. A duplicate UID repair completed entry 328 indicates a completion status for the duplicate UID detect and repair process. After applying the business rules filters in step 226, the updated machine data files are used to determine whether a machine is unique and whether the UID found on the machine during a scan operation is a duplicate. The updated machine data files also provide the necessary information to generate email messages to network nodes assigned owners with a duplicate UID problem.

It is next decided whether there is a duplicate UID for each unique network node in decision step 230. If a node does not have a duplicate UID, then the process for that node proceeds to ending point 234, since it has been determined that the network node truly has a unique UID. Otherwise, all network nodes that are determined to have a duplicate UID require further processing steps.

Figure 4:
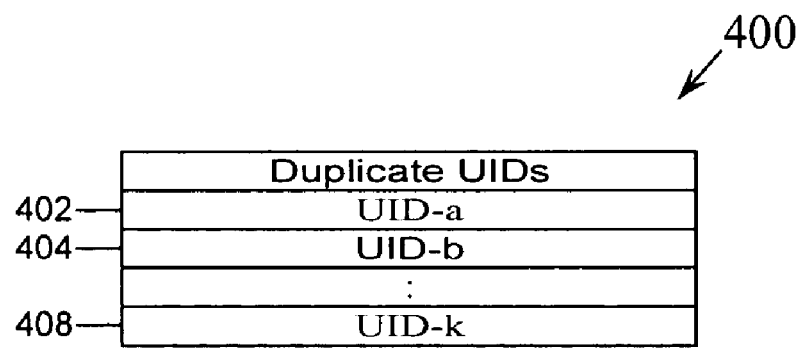
FIG. 4 illustrates an example of a duplicate unique identifier table in accordance with the present invention.

The duplicate UIDs are entered into a duplicate UID look-up-table, such as duplicate UID look-up-table 400 of FIG. 4, in step 238 and stored in step 242 in server memory 118. The process used to enter a duplicate UID ensures there is only one UID entry, for example, UID-a 402, UID-b 404 and UID-k 408, for each duplicate UIDs found that is of the same value. For example, UID-b 404 is represented only once in the duplicate UID table 400 even though there may have been a large number of network nodes with that particular UID-b. It is further noted, that to support the server test 206 that occurs during each collection phase 204 of the distributed computing system, the duplicate UID table 400 is used. For example, on a scan operation, when a network node presents its UID in the scan results data in network scan processing engine 140, the server compares the UID received from the network node with the UIDs on the duplicate UID listing in duplicate UID analysis and update function 152. If a duplicate UID is found on the duplicate UID list, independent of why the UID was entered on the duplicate UID list, a new UID is assigned in duplicate UID repair and message gen function 156 and sent to the network node through the network 112 interface to replace the initial UID found on the network node. It is noted that an entry in the duplicate UID table does not require information concerning where a duplicate UID was found, when it was found, or similar information. Once a UID is entered into the duplicate UID table, it remains there since the problem may reoccur in the future. For efficient processing, the duplicate UID table is stored in step 242 in the server 115 memory 118 as look-up-table 140.

An independent set of operations is also performed for preparing email messages for network node users whose machines have duplicate UID problems. A list of valid email addresses is prepared in step 250, the messages to be sent is prepared in step 254, and the messages are sent in step 258. If a machine with a duplicate UID was determined to have an inactive email address or that the email address, obtained in the scan collection phase, is incorrect, the email message cannot be sent. Even if an email message cannot be sent, the duplicate UID has been recorded and any time in the future a network node shows up in the distributed computing system with the duplicate UID, a new UID will be automatically generated during the collection phase 204 as illustrated in steps 206 and 210. A subsequent scanning operation may occur as a result of a user initiating a scan operation as a response to a duplicate UID email message the user received or through periodic scanning operations of the network as initiated and as may be required, for example, by a network node login into the network 112. Even if duplicate UIDs were found in the look-up-table on the server and corrected, the other scanned results continue to be processed as indicated in processing phase 212.

The number of email messages sent for duplicate UID machines is recorded as an indication of a continuing problem and may be used to modify the message to the user to indicate a continuing problem. Step 262 makes a determination whether a duplicate UID has associated with it a duplicate UID email count value. For the first time a duplicate UID is determined, a duplicate UID email count is set to one in step 266 indicating a first duplicate UID email message has been sent. Subsequently, each time a duplicate UID is found that has a duplicate UID email count greater than or equal to 1, the duplicate UID email counter value is incremented indicating the problem is reoccurring to the extend indicated by the count value.

While the present invention has been disclosed in a presently preferred context, it will be recognized that the present teachings may be adapted to a variety of contexts consistent with this disclosure and the claims that follow. By way of example, even though a preferred order of processing steps is described, it can be appreciated that an alternative ordering of processing steps can accomplish the inventive aspects of the present invention. As an alternative, processing phase 212 could begin immediately after the collection phase 204 ends and processing steps 206 and 210 could be accomplished later in the processing sequence before step 230.

I claim:

1. A method of resolving duplicate network node identification in an asset management computing system having an inventory of network nodes, the method comprising:

scanning the inventory of network nodes to obtain a first network node information record including a first unique identifier (UID) from a first network node;

determining that the first UID is not listed in a duplicate UID table, wherein the duplicate UID table stores one or more duplicate UID detected from previous scans of the inventory of network nodes;

processing the first network node information record including the first UID through a series of business rule filters to determine the first network node is a unique network node;

determining that the first UID is a duplicate of a second UID associated with a second network node, wherein the second UID is not listed in the duplicate UID table;

entering the first UID in the duplicate UID table to update the duplicate UID table; and assigning a new UID to be installed on the first network node, when the first UID is found in the updated duplicate UID table.

2. The method of claim 1 wherein the first network node is a workstation connected through an Internet network medium to a centralized server.

3. The method of claim 1 further comprising sending a scan request to network nodes with a duplicate UID, the request being to begin a scan operation that causes the network node to replace the duplicate UID with a UID that is not a duplicate.

4. The method of claim 1 wherein the first network node information record comprises:

a listing of the first network node detailed machine description data; and a hardware inventory tracking barcode entry.

5. The method of claim 1 wherein the processing the first network node information record including the first UID through a series of business rules filters comprises:

determining a valid email address associated with the first network node information record; and determining that detailed machine description data is complete for the first network node information record.

6. The method of claim 2 wherein the step of generating an entry in the duplicate UID table for the first UID to form an updated duplicate UID table further comprises:

updating a look up table containing duplicate UID entries; and loading the look up table in memory of the centralized server as the updated duplicate UID table.

7. The method of claim 1 further comprising:

generating, on a subsequent scan of the inventory of network nodes, a new UID to be installed on the first network node in response to the first UID being listed in the updated duplicate UID table.

8. A system for resolving duplicate network node identification in an asset management computing system, comprising:

a plurality of network nodes each network node having a unique identifier (UID) and a network node information record;

a memory for storing computer readable code, data, and a duplicate UID table, wherein the duplicate UID table stores one or more duplicate UID detected from previous scans of the inventory of network nodes;

disk storage devices storing a collection database, at least one processing database;

a network scan processing engine coupled to an Internet network providing communications between network nodes and a server;

the server with an internal processor operatively coupled to the memory, disk storage devices, and Internet network, the server operative to:

initiate a first scan operation on the inventory of network nodes to obtain a first network node information record including a first UID from a first network node;

determine the first UID is not listed in the duplicate UID table;

scan the inventory of network nodes in a subsequent scan operation to obtain from the first network node a changed first network node information record including a changed first UID that is different from the first UID obtained from the first scan operation;

generate a new UID to be installed on a network node if the changed first UID is found on the duplicate UID table;

process the changed first network node information record including the changed first UID through a series of business rule filters to determine the first network node is a unique network node;

determine the changed first UID is a duplicate of a second UID on a second network node, wherein the second UID is not listed in the duplicate UID table; and update the duplicate UID table to include the changed first UID.

9. The system of claim 8 wherein a scan operates on a network node to create an inventory of hardware and software components on the network node represented by a network node's UID and machine data file.

10. The system of claim 8 wherein the business rule filters further determine whether a valid email address exists for a user registered as an owner of each network node.

11. The system of claim 8 wherein the network node information record including a unique identification (UID) from each network node is stored in a collection database during a collection phase.

12. The system of claim 11 wherein during the collection phase, a determination is made whether the UID from each network node is listed in the duplicate UID table and in response to finding a UID in the duplicate UID table assigning a new UID to the associated network node.

* * * * *